United States Patent
Nedorezov et al.

(10) Patent No.: US 9,187,076 B2
(45) Date of Patent: *Nov. 17, 2015

(54) METHODS AND SYSTEMS FOR ASSISTED DIRECT START CONTROL

(71) Applicant: Ford Global Technologies, LLC, Dearborn, MI (US)

(72) Inventors: Felix Nedorezov, Rochester Hill, MI (US); Hong Jiang, Birmingham, MI (US); Davor David Hrovat, Ann Arbor, MI (US); Alex O'Connor Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/058,851

(22) Filed: Oct. 21, 2013

(65) Prior Publication Data

US 2014/0045650 A1 Feb. 13, 2014

Related U.S. Application Data

(62) Division of application No. 12/981,895, filed on Dec. 30, 2010, now Pat. No. 8,574,125.

(51) Int. Cl.
| | |
|---|---|
| *F16H 45/02* | (2006.01) |
| *B60W 10/06* | (2006.01) |
| *F02D 41/06* | (2006.01) |
| *F02D 41/00* | (2006.01) |
| *F02N 11/08* | (2006.01) |
| *B60W 10/02* | (2006.01) |
| *B60W 10/10* | (2012.01) |
| *B60W 30/192* | (2012.01) |

(52) U.S. Cl.
CPC ............. *B60W 10/06* (2013.01); *B60W 10/023* (2013.01); *F02D 41/065* (2013.01); *B60W 10/026* (2013.01); *B60W 10/10* (2013.01); *B60W 30/192* (2013.01); *B60W 2510/0241* (2013.01); *F02D 2041/001* (2013.01); *F02D 2200/501* (2013.01); *F02N 11/0814* (2013.01); *Y10T 477/631* (2015.01); *Y10T 477/735* (2015.01); *Y10T 477/753* (2015.01)

(58) Field of Classification Search
CPC ..... B60W 10/02; B60W 10/06; B60W 10/00; F16H 61/0213
See application file for complete search history.

(56) References Cited

U.S. PATENT DOCUMENTS

| | | |
|---|---|---|
| 4,539,643 A | 9/1985 | Suzuki et al. |
| 5,201,250 A | 4/1993 | Kato et al. |
| 5,651,752 A | 7/1997 | Wakahara et al. |

(Continued)

FOREIGN PATENT DOCUMENTS

| | | |
|---|---|---|
| EP | 1 069 346 A2 | 1/2001 |
| EP | 1 344 673 A2 | 9/2003 |

*Primary Examiner* — David J Hlavka
(74) *Attorney, Agent, or Firm* — Julia Voutyras; Alleman Hall McCoy Russell & Tuttle LLP

(57) ABSTRACT

Methods and systems are provided for reducing audible clunks and objectionable drive feel in vehicles including start/stop systems. In one example, a vehicle engine is shutdown during vehicle coasting. The vehicle engine is then restarted, while the vehicle is moving with a torque converter clutch disengaged. A transmission clutch pressure is then adjusted during the restart based on a torque converter output speed relative to a torque converter input speed.

11 Claims, 5 Drawing Sheets

(56) References Cited

U.S. PATENT DOCUMENTS

| | | |
|---|---|---|
| 6,190,284 B1 | 2/2001 | Kuroda et al. |
| 6,244,368 B1 | 6/2001 | Ando et al. |
| 6,334,834 B1 | 1/2002 | Mizutani et al. |
| 6,342,027 B1 | 1/2002 | Suzuki |
| 6,344,834 B1 | 2/2002 | Josypenko |
| 6,799,109 B2 | 9/2004 | Nakamori et al. |
| 6,908,413 B2 | 6/2005 | Ayabe et al. |
| 6,945,905 B2 | 9/2005 | Tamai et al. |
| 6,951,525 B2 | 10/2005 | Ries-Muller |
| 7,041,030 B2 | 5/2006 | Kuroda et al. |
| 7,243,011 B2 | 7/2007 | Koenig et al. |
| 7,316,631 B2 | 1/2008 | Tsunekawa |
| 7,329,206 B2 | 2/2008 | Tanaka |
| 7,360,616 B2 | 4/2008 | Schiele |
| 7,370,715 B2 | 5/2008 | Colvin et al. |
| 7,683,503 B2 | 3/2010 | Yamaguchi |
| 8,147,373 B2 | 4/2012 | Soliman et al. |
| 8,192,327 B2 * | 6/2012 | Gibson et al. .................. 477/77 |
| 8,265,844 B2 | 9/2012 | Takei et al. |
| 8,352,141 B2 | 1/2013 | Schuhen |
| 8,414,456 B2 | 4/2013 | Nedorezov et al. |
| 8,840,525 B2 * | 9/2014 | Enoki ............... 477/77 |
| 2002/0019293 A1 | 2/2002 | Noda et al. |
| 2004/0153231 A1 * | 8/2004 | Itoh et al. ................. 701/54 |
| 2004/0153236 A1 * | 8/2004 | Itoh et al. ................. 701/113 |
| 2005/0133006 A1 | 6/2005 | Frenz et al. |
| 2007/0102211 A1 | 5/2007 | Nozaki et al. |
| 2008/0214354 A1 | 9/2008 | Dickinson |
| 2010/0036574 A1 * | 2/2010 | Hopp ........................... 701/68 |
| 2010/0167871 A1 * | 7/2010 | Inagaki et al. ................. 477/5 |
| 2010/0228453 A1 * | 9/2010 | Saito ............... 701/54 |
| 2011/0053735 A1 | 3/2011 | Lewis et al. |
| 2011/0054765 A1 | 3/2011 | Lewis et al. |
| 2012/0010045 A1 * | 1/2012 | Nedorezov et al. ............. 477/79 |
| 2012/0135840 A1 | 5/2012 | Tatewaki et al. |
| 2012/0295759 A1 * | 11/2012 | Fujiwara ................. 477/167 |
| 2013/0296119 A1 * | 11/2013 | Reed et al. ................. 477/5 |

* cited by examiner

METHODS AND SYSTEMS FOR ASSISTED DIRECT START CONTROL

CROSS REFERENCE TO RELATED APPLICATIONS

The present application is a divisional of U.S. Patent Application No. 12/981,895, "Methods and Systems for Assisted Direct Start Control," filed on Dec. 30, 2010, the entire contents of which are hereby incorporated by reference for all purposes.

FIELD

The present application relates to methods and systems for controlling an engine shut-down and a subsequent restart.

BACKGROUND AND SUMMARY

Vehicle engines may be configured to be shut-off during idle conditions, such as when the vehicle comes to a stop while a brake is applied, and restarted once the brake is released (e.g., a stop/start system). Such stop/start systems enable fuel savings, reduction in exhaust emissions, reduction in noise, and the like. Fuel consumption may be further reduced by shutting down the engine before braking, for example, while the vehicle is moving during extended coasting periods.

However, the inventors have recognized an issue with such systems. Frequent switching between engine idle-stop and engine restart operations may lead to objectionable noise and clunks that affect drive feel due to the transition between engine stopped and engine spinning conditions. For example, lash in various transmission components, such as gears, chain drives, differentials, etc., can cause increased noise, vibration, and harshness (NVH), due to engagement and disengagement that occurs. As such, these may reduce drive feel as well as customer satisfaction. Furthermore, repeated clunks and related torsional stress may degrade transmission or driveline components (e.g., transmission gears, clutches, etc.) over time.

Thus in one example, some of the above issues may be at least partly addressed by a method of operating a vehicle engine having a torque converter and an automatic transmission, each with a clutch. One example embodiment comprises, during a vehicle moving condition, spinning down the engine to rest, and during a starter-assisted restart from the rest, and while the torque converter clutch is disengaged, adjusting a degree of transmission clutch engagement based on torque converter output speed relative to torque converter input speed.

In one example, a vehicle may be coasting with the accelerator pedal and the brake pedal not depressed, and a vehicle speed being above a threshold. In response to the coasting condition, the engine may be shutdown, for example, by shutting off a fuel supply and spark to the engine. While the engine spins down to rest, a torque converter clutch (e.g., torque converter lock-up clutch) may be disengaged. Further, a clutch pressure of a vehicle transmission clutch (e.g., forward clutch) may be reduced to a near stroke level (e.g., at or just below the stroke level) during the engine spin-down. In this way, the clutch may be kept pre-stroked by maintaining the clutch pressure near a stroke level until a subsequent restart from engine rest.

During a subsequent restart, while the vehicle is still moving, and while the torque converter clutch is still disengaged, the engine may be started using starter assist by activating a starter motor. Further, a degree of engagement of the transmission clutch may be adjusted (e.g., increased) based on a torque converter output speed relative to a torque converter input speed. In one example, when the torque converter input speed (as inferred from the engine speed, for example) is lower than the torque converter output speed (as inferred from a transmission input shaft speed, for example) indicating that the engine is not yet applying positive torque to the driveline, a clutch pressure of the transmission forward clutch may be increased at a first lower rate, and/or to a first lower amount of clutch pressure. The first amount and/or rate may be based on a difference between the speeds when the torque converter input speed is lower than the torque converter output speed. In comparison, once the torque converter input speed exceeds than the torque converter output speed and the engine is now applying positive torque through the driveline, the clutch pressure may be increased at a second higher rate, and/or to a second higher amount of clutch pressure. The second amount and/or rate may be based on a difference between the speeds when the torque converter input speed is higher than the torque converter output speed. In this way, the degree of torque applied during the transition through the lash region may be kept relatively low until after the lash transition is completed (as indicated by the torque converter speeds) to reduce driveline clunk. Then, once the transition is completed, the clutch pressure may be applied to a sufficient level to provide the desired torque to propel the vehicle.

It will be appreciated that while the degree of transmission clutch engagement may be adjusted based on a difference of speeds across the torque converter, other approaches are possible. For example, the adjustment may be based on a ratio (or alternate function) of speeds across the torque converter.

In this way, an engine may be restarted with starter motor assistance while the vehicle is still moving, with reduced torque disturbances in the driveline. By keeping a transmission clutch pre-stroked during an engine shutdown, delays in clutch engagement during a subsequent restart may be reduced. By reducing the torque capacity of a transmission clutch during an engine shutdown, and then increasing the torque capacity of the clutch based on an engine speed relative to a transmission input shaft speed, a smoother transition through the lash region of the transmission may be enabled. By improving overall engine torque control during an engine restart, torque disturbances and audible clunks may be reduced, thereby substantially improving the quality of engine restarts.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
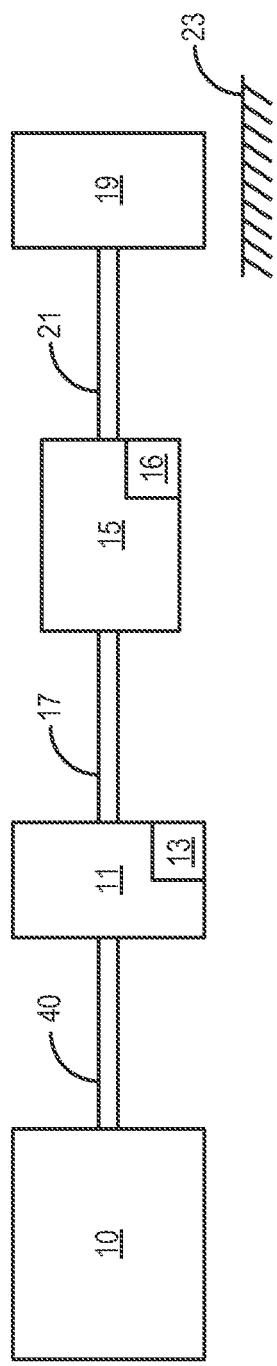
FIG. 1 shows a block diagram of a vehicle illustrating various power-train components.
Figure 2:
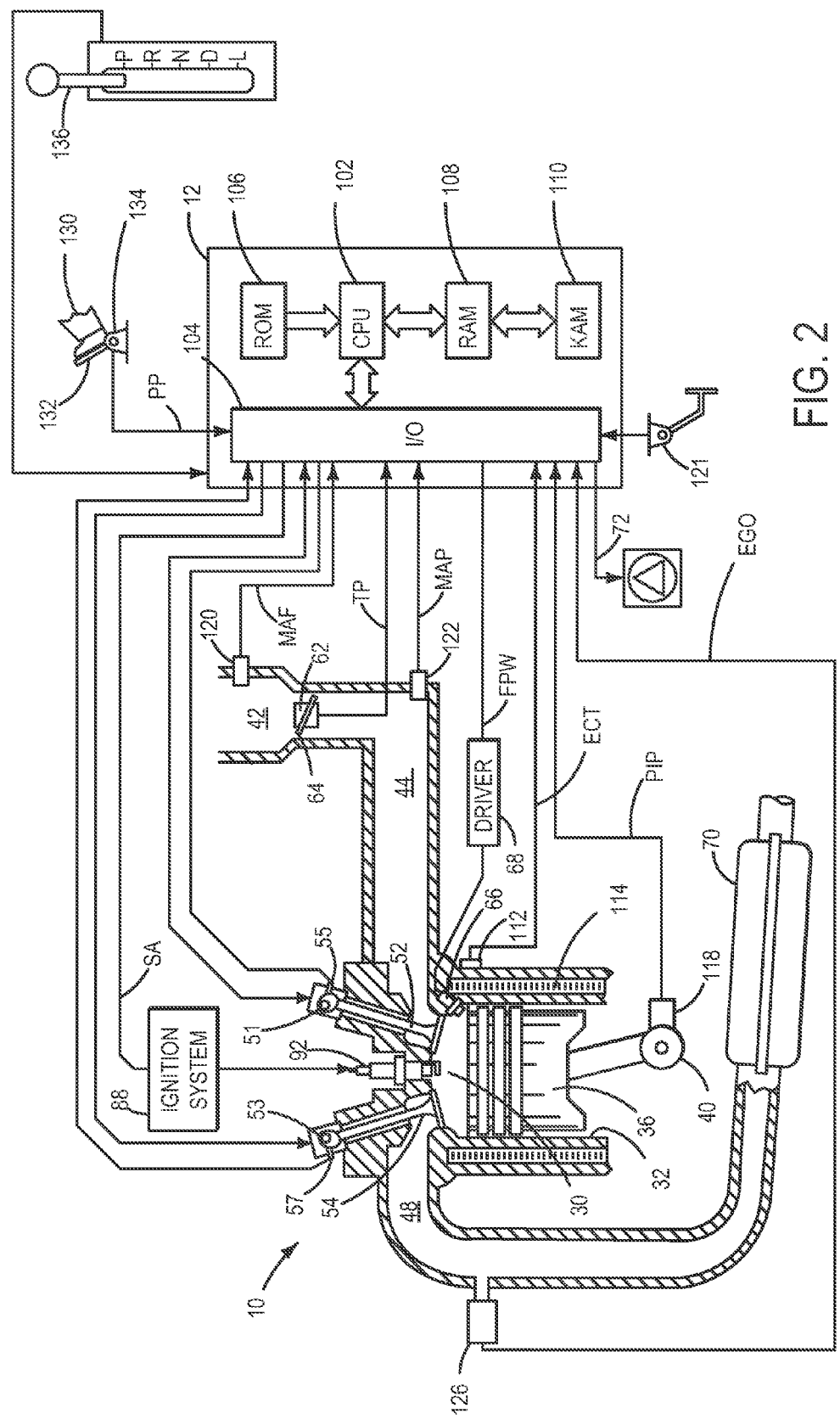
FIG. 2 shows schematic diagram of an engine.

The following description relates to a method for controlling an internal combustion engine coupled to a transmission and a torque converter in a motor vehicle, such as in the vehicle system of FIGS. 1-2. Each of the transmission and the torque converter may include a clutch. During vehicle coasting conditions, an engine may be turned off and allowed to spin-down to rest while the vehicle is traveling. Additionally, as elaborated in FIG. 3, a torque converter clutch may be disengaged while a transmission clutch (e.g., forward clutch) is maintained in a stroking condition by reducing the clutch pressure to a near stroke level. During a subsequent engine restart, with the torque converter clutch disengaged, the engine may be cranked with a starter while the vehicle is moving. Additionally, as elaborated in FIG. 4, a degree of engagement of the forward clutch may be adjusted based on the input and output speed of the torque converter. For example, the clutch pressure may be increased at a lower rate when the torque converter input speed is lower than the torque converter output speed, and increased at a higher rate when the input speed exceeds the output speed. An engine controller may be configured with code to perform a control routine, such as the routines of FIGS. 3-4, to adjust the clutch pressure during engine shut-down and restart operations, responsive to, at least a speed difference across the torque converter. Example adjustments are graphically depicted in FIG. 5. In this way, by maintaining at least some clutch pressure during an engine shutdown and gradually increasing the clutch pressure during the subsequent restart, torque control during a restart may be improved, thereby reducing torsional stress and torque disturbances arising due to frequent transition between positive and negative torque applied through the driveline components. As such, this may improve the quality of vehicle restarts, and reduce transmission component degradation.

Referring to FIG. 1, internal combustion engine 10, further described herein with particular reference to FIG. 2, is shown coupled to torque converter 11 via crankshaft 40. Specifically, engine 10 is coupled to a pump of torque converter 11. Thus, a torque converter input speed (or pump speed) may be based on (or inferred from) engine speed. Torque converter 11 is also coupled to transmission 15 via a transmission input shaft 17. Specifically, transmission input shaft 17 couples transmission 15 to a turbine of torque converter 11. Thus, a torque converter output speed (or turbine speed) may be based on (or inferred from) a transmission input shaft speed. Torque converter 11 has a lock-up clutch 13 which can be engaged, disengaged, or partially engaged. When the clutch 13 is disengaged, the torque converter is said to be in an unlocked state. In one example, torque converter 11 is a component of transmission 15 and the torque converter lock-up clutch 13 is a transmission clutch.

Transmission 15 may be an automatic stepped gear ratio transmission. For example, transmission 15 may be an electronically controlled transmission with a plurality of selectable discrete gear ratios. Transmission 15 may also comprise various other gears, such as, for example, a final drive ratio (not shown). Alternatively, transmission 15 may be a continuously variable transmission (CVT). Transmission 15 may include a plurality of transmission clutches including a forward clutch 16. A degree of engagement of forward clutch 16 may be adjusted by varying a clutch pressure to thereby adjust a torque transmitted through transmission 15.

Transmission 15 may be further coupled to tire 19 via axle 21. Tire 19 interfaces the vehicle (not shown) to the road 23. Note that in one example embodiment, this power-train is coupled in a passenger vehicle that travels on the road. While various vehicle configurations may be used, in one example, the engine is the sole motive power source, and thus the vehicle is not a hybrid-electric, hybrid-plug-in, etc. In other embodiments, the method may be incorporated into a hybrid vehicle.

FIG. 2 is a schematic diagram showing one cylinder of multi-cylinder engine 10, which may be included in a propulsion system of an automobile. Engine 10 may be controlled at least partially by a control system including controller 12 and by input from a vehicle operator 130 via an input device. In one example, the input device includes an accelerator pedal 132 and a pedal position sensor 134 for generating a proportional pedal position signal PP. In another example, the input device includes a transmission lever 136 that may be shifted between different gear options by the driver based on a desired transmission output. In one preferred embodiment, the driver may have the following driver selectable options: park (P), reverse (R), neutral (N), driver (D), and low (L). In the depicted embodiment, the lever is known as a PRNDL lever, corresponding to the different options. In one example, when in park or neutral, substantially no torque may be transmitted from the engine to the transmission output. In drive, an electronic controller can control the transmission to select any available forward gear ratios. In reverse, a single reverse gear is selected. In low, only a lower set of forward gear ratios can be selected by the electronic controller. In some embodiments, there may be a low 1 and low 2 option. Transmission lever 136 may be located on a steering column or between driver and passenger seats.

Combustion chamber 30 of engine 10 may include cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. Exhaust camshaft 53 operates exhaust valve 54 in accordance with the profile of a cam located along the length of the exhaust camshaft. Intake camshaft 51 operates intake valve 52 in accordance with the profile of a cam located along the length of the camshaft. Exhaust cam position sensor 57 and intake cam position sensor 55 relay respective camshaft positions to controller 12. Pump 72 supplies oil to index intake camshaft 51 and exhaust camshaft 53 relative to crankshaft 40 based on commands to camshaft actuators (not shown) supplied by controller 12. Pump 72 may be electrically driven so that camshafts may be indexed when engine 10 is not rotating.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 2 as a microcomputer, including microprocessor unit 102, input/output ports 104, an electronic storage medium for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; vehicle brake 121; a profile ignition pickup signal (PIP) from Hall effect sensor 118 (or other type) coupled to crankshaft 40; throttle position (TP) from a throttle position sensor; and absolute manifold pressure signal, MAP, from manifold pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor unit 102 for performing the methods described below as well as other variants that are anticipated but not specifically listed.

Controller 12 also receives signals from and provides control signals to a transmission (not shown). Transmission signals may include but are not limited to transmission input and output speeds, signals for regulating transmission line pressure (e.g., fluid pressure supplied to transmission clutches), and signals for controlling pressure supplied to clutches for actuating transmission gears.

As described above, FIG. 2 shows only one cylinder of a multi-cylinder engine, and that each cylinder may similarly include its own set of intake/exhaust valves, fuel injector, spark plug, etc.

Figure 3:
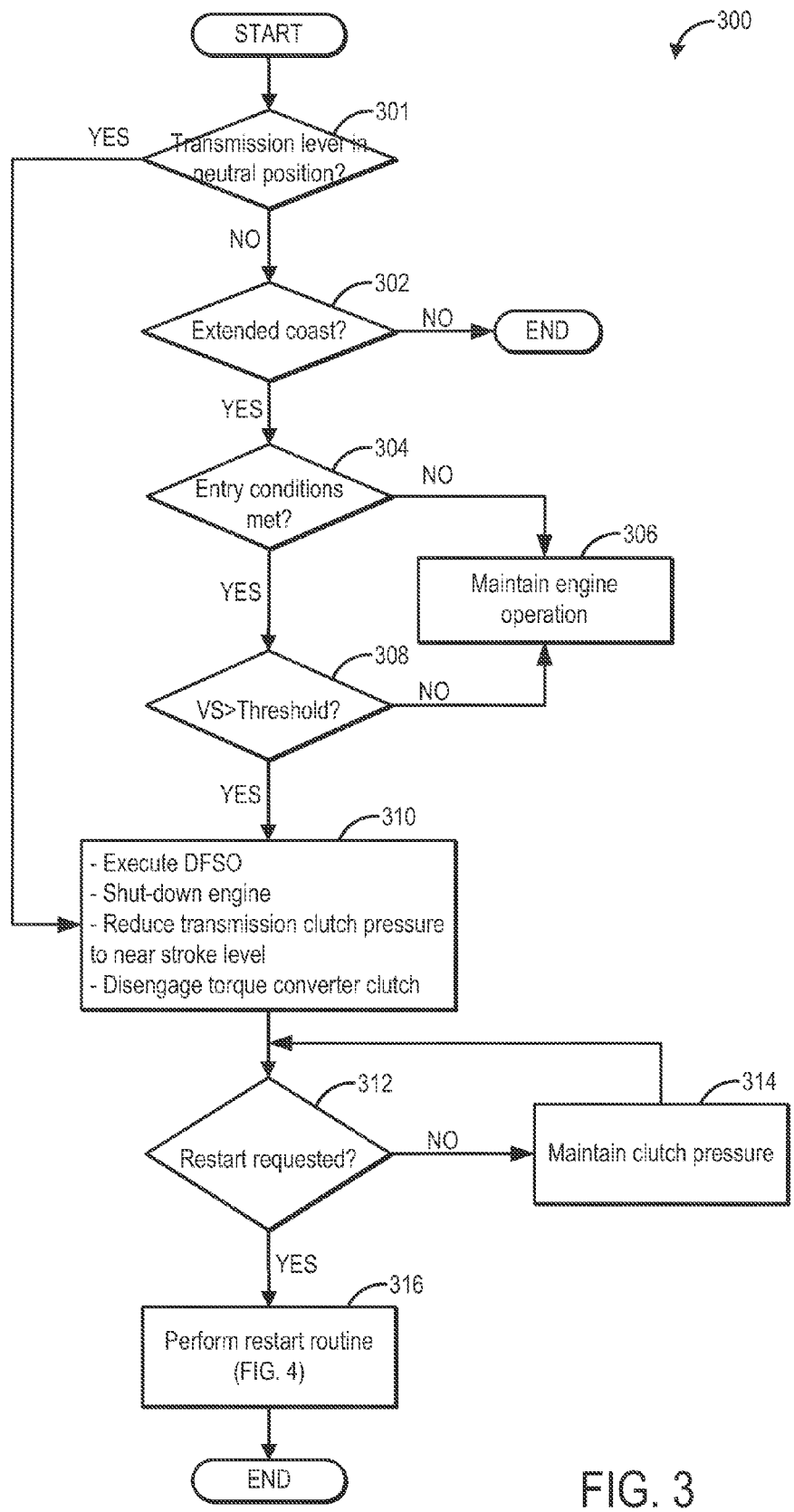
FIG. 3 shows a flow chart illustrating a control routine for shutting down an engine during extended coasting conditions.

Now turning to FIG. 3, a control routine 300 is illustrated for shutting down an engine during a vehicle moving condition, such as during vehicle coasting. Specifically, routine 300 identifies opportunities while the vehicle is moving during which combustion in the engine may be deactivated. The routine further adjusts the clutch pressure of one or more transmission clutches to reduce a torque capacity of the transmission when the engine is shut down, while keeping the clutch pre-stroked.

At 301, the routine may determine whether the vehicle operator has moved a transmission lever (such as PRNDL lever of FIG. 2) from a drive position (e.g., position D) to a neutral position (e.g., position N). In one example, a driver may shift the lever from a drive position to a neutral position to allow the vehicle to coast with the engine off. Thus, by shifting from drive to neutral, the operator may manually over-ride inferred engine shutdown commands, such as automatically inferred engine shutdown commands responsive to extended coasting conditions elaborated herein below. If the driver has shifted the lever to the neutral position, then in response to a vehicle moving condition wherein the vehicle is moving with a transmission lever in a neutral position, the routine may proceed to 310 wherein an electronic controller may shut down the engine and let the engine spin down to rest. In one example, as elaborated below, the engine may be stopped by shutting off fuel supply and spark to the engine.

If the driver has not shifted the transmission to neutral, then at 302, extended coasting conditions may be confirmed. For example, vehicle coasting may be inferred when the vehicle is moving with the brake pedal and the accelerator pedal not being pressed. If extended coast conditions are not confirmed, the routine may end. Upon confirmation of vehicle coasting, at 304, entry conditions for a vehicle coast shut-down may be confirmed. Entry conditions may include, but are not limited to, engine purging conditions, a charge state of a vehicle battery, engine temperature, emission control device temperature, etc. For example, the battery may be employed to run various components (e.g., electric motors, lights, etc.) while the engine is off; thus, the engine may not be shutdown unless the battery attains a certain amount of charge. As another example, if the fuel vapor purging system is currently purging fuel vapors from the fuel system into the engine intake manifold, the engine may n of be shutdown until after completion of the purging. If entry conditions are not met, engine operation may be maintained at 306, that is, the engine may not be shutdown.

If entry conditions are met, then at 308, the vehicle speed may be estimated and it may be determined whether the vehicle speed (VS) is above a threshold value. In one example, the threshold speed may reflect a speed below which a vehicle coast shut-down operation may not substantially improve the vehicle's fuel economy, and thus the shut-down operation may be disabled in this case to maintain engine operation. In another example, the threshold speed may correspond to an amount of vehicle inertia that may not be able to sustain vehicle coasting for a substantial duration, and wherein a potential vehicle stall may be imminent. Thus, if the vehicle speed is below the threshold speed, the routine may return to 306 to maintain engine operation and not shut-down the engine.

If vehicle speed is at or above the threshold, then at 310, the engine may be shutdown, or stopped, where the engine may spin down to rest. In one example, spinning down the engine to rest may include shutting off spark and fuel supply to the engine, for example. Further, a torque converter lock-up clutch may be disengaged, or fully unlocked, to reduce a wheel torque applied on the engine.

Additionally at 310, a degree of transmission clutch engagement may be adjusted while the engine is spinning down to rest. This may include decreasing the transmission clutch engagement to a near stroke level, and maintaining the transmission clutch engagement at the near stroke level until a subsequent restart. In one example, the transmission clutch that is adjusted is a transmission forward clutch. Therein, adjusting a degree of engagement of the transmission clutch may include adjusting (for example, reducing), a clutch pressure of the transmission forward clutch to a near stroke level (that is, at or just below the stroke level pressure). In this way, by keeping the clutch pre-stroked, delays in clutch engagement during a subsequent restart may be reduced. By reducing the clutch pressure during the engine spin down, the torque capacity of the transmission is decreased. As elaborated in FIG. 4, by gradually increasing the torque capacity of the clutch during the subsequent engine restart, a transition through a lash region of the transmission may be improved. Additionally, by turning off the engine while the fuel injectors are shut-off and while the operator's foot is off the accelerator pedal and brake pedal, the amount of air pumped into the catalytic converter of the vehicle system's emission control device may be reduced. As such, this reduces the need for post fuel shut-off enrichment, thereby providing additional fuel economy benefits. The clutch pressure adjustment during a vehicle moving engine shutdown may be contrasted with that of an engine shutdown during stopped vehicle conditions, such as when a driver turns off the vehicle. In such a non-moving shutdown, the clutch engagement may be reduced below the stroke level, such as fully disengaged.

Figure 4:
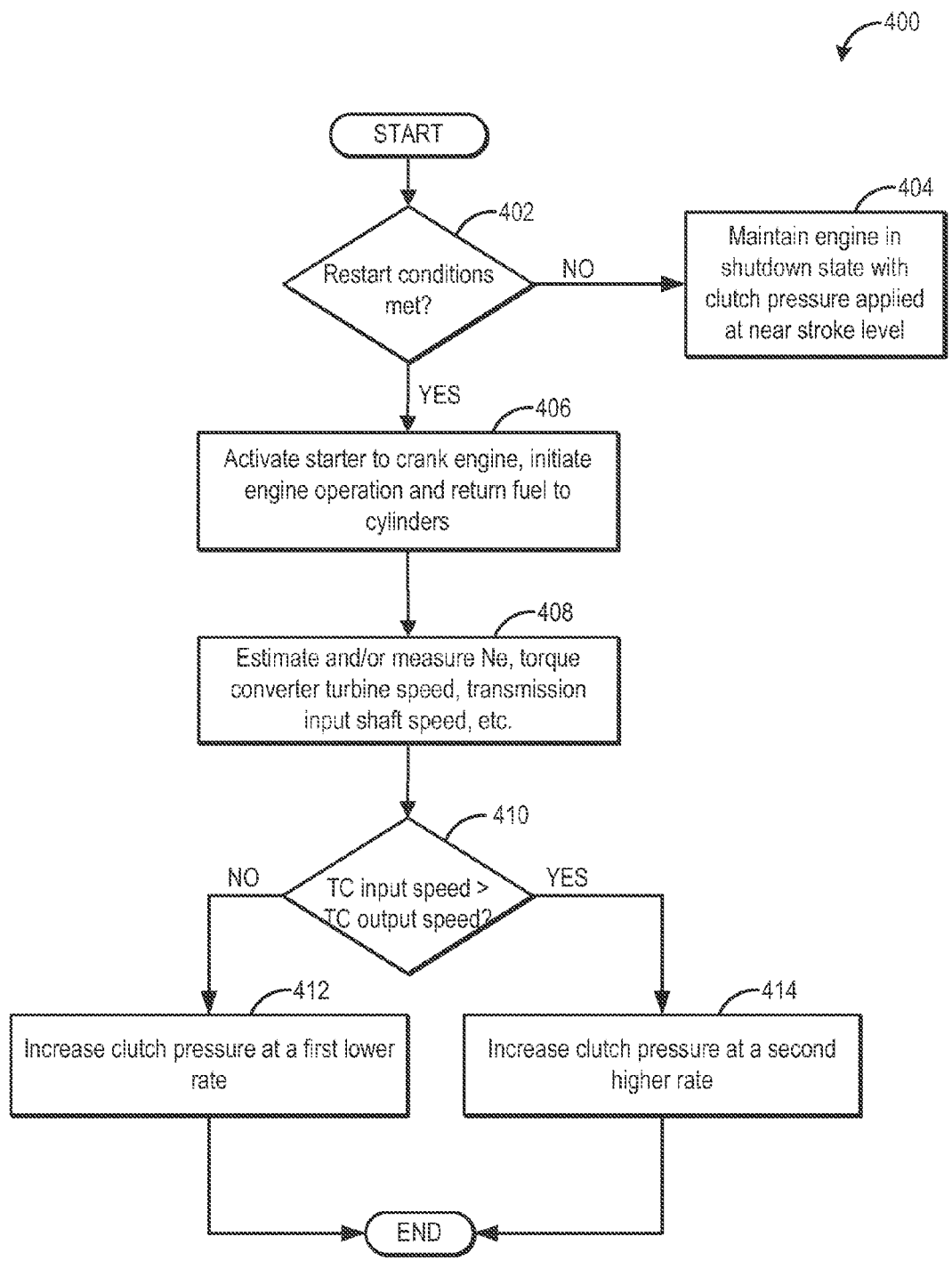
FIG. 4 shows a flow chart illustrating a control routine for restarting an engine from a shutdown condition.

At 312, it may be determined whether a restart is requested. The engine restart may be initiated by a throttle or torque demand, by a change in vehicle speed, by a vehicle speed that is above or below a threshold, by a change in brake pedal or accelerator pedal position, by other restart conditions, and/or combinations thereof. Further, numerous embodiments, elaborated with reference to FIG. 4, are anticipated under which different conditions may be used to determine whether or not the engine is to be restarted. If a restart is not requested, then at 314, the engine may remain shutdown with the torque converter clutch disengaged and a pressure applied to the forward clutch of the transmission maintained at the near stroke level. If restart conditions are confirmed, at 316, a restart routine, as depicted in FIG. 4, may be performed.

FIG. 4 illustrates a control routine 400 for restarting a vehicle engine while the vehicle is moving, such as, during vehicle coasting. Specifically, routine 400 restarts the engine from the engine rest condition while the vehicle is moving and with the torque converter lock-up clutch disengaged. The routine further modulates the clutch pressure of one or more transmission clutches, based on a speed across a torque converter, to reduce audible clunks and enable a smooth transition through a lash region of the transmission during the restart.

At 402, engine restart conditions may be confirmed. As such, an engine restart may be initiated by a throttle or torque demand, by a change in vehicle speed, by a vehicle speed that is above or below a threshold, by a change in brake pedal or accelerator pedal position, or by other restart conditions. Various other embodiments under which the engine may be restarted include, for example, the vehicle speed being below a threshold, the threshold representative of a vehicle inertia below which a coasting operation may not be sustained. In another embodiment, the brake position (e.g., the position of the vehicle brake pedal) and vehicle speed may be used to determine when to restart the engine. For example, if the operator's foot remains off the brake pedal, an engine at rest may stay at rest until the vehicle comes to a stop and/or the operator presses their foot on the brake. Further, a change in position of the brake pedal (e.g., the brake pedal is repositioned) may be used to initiate an engine start. In another embodiment, an engine restart may be initiated based on a rate of change in vehicle speed. For example, if the operator's foot is off the brake and the vehicle is slowing because the road grade is changing (for example, when the vehicle is travelling on an uphill track), the engine may be restarted. Further, different signals and combinations of signals may be used to determine whether to restart the engine at 402.

If engine restart conditions are not confirmed, then at 404, as elaborated at 314 (FIG. 3), the engine may remain shut-down with the torque converter clutch disengaged and a pressure applied to the forward clutch of the transmission maintained at the near stroke level. If engine restart conditions are confirmed, at 406, the engine may be started using starter motor assistance to initiate engine cranking Additionally, engine operation may be initiated, for example, by resuming fuel injection. The starter assist may only be used for a duration until the engine speed reaches a threshold speed. For example, the starter may be uncoupled from the engine before the engine speed reaches the turbine speed of the transmission.

At 408, engine operating conditions may be estimated and/or measured. These may include, for example, engine speed, a torque converter input speed, a torque converter output speed (that is, turbine speed), a transmission input shaft speed, etc. In one example, the torque converter input speed may be inferred from the engine speed while the torque converter output speed may be inferred from the transmission input shaft speed.

At 410, the torque converter input speed may be compared relative to the torque converter output speed. Alternatively, an engine speed may be compared relative to a transmission turbine speed or input shaft speed. In one example (as illustrated), a difference of speeds across the torque converter may be compared to a threshold range. In another example, a ratio of speeds across the torque converter may be compared to a threshold range. In still other example, the comparison may include an alternate function of the input speed and the output speed of the torque converter.

Next, during the starter-assisted restart from the engine rest condition, and while the torque converter clutch is still disengaged, a torque capacity of the transmission may be adjusted by adjusting a degree of transmission clutch engagement based on the torque converter output speed relative to the torque converter input speed. Specifically, at 412, the routine includes increasing the degree of transmission clutch engagement at a first lower rate (and/or by a first lower amount) when the torque converter input speed is below the torque converter output speed and/or within a range around the output speed (e.g., within 10 RPM). In comparison, at 414, the routine includes increasing the degree of transmission clutch engagement at a second higher rate (and/or by a second higher amount) when the torque converter input speed is above, for example sufficiently above (e.g., more than 10 RPM above) the torque converter output speed. The rate and/or amount of increase may be further based on a difference, a ratio, or an alternate function of the speed across the torque converter.

In one example, adjusting a degree of transmission clutch engagement includes adjusting a clutch pressure of a transmission forward clutch based on the torque converter output speed (as measured or inferred based on the transmission turbine speed) relative to the torque converter input speed (as measured or inferred based on engine speed). Specifically, an amount and/or a rate of the increase in forward clutch pressure may be adjusted based on the speed comparison. For example, the clutch pressure may be increased to a first, higher amount and/or at a first, higher rate when the engine speed (or torque converter input speed) is lower than, or within a range of, the turbine speed (or torque converter output speed), the first amount and/or first rate based on a difference between the speeds when the torque converter input speed is lower than the torque converter output speed. Thus, as the difference increases, the first amount and/or rate may be increased. In another example, the clutch pressure may be increased to a second, higher amount and/or at a second, higher rate when the engine speed (or torque converter input speed) is higher than the turbine speed (or torque converter output speed), the second amount and/or second rate based on the difference between the speeds when the torque converter input speed is higher than the torque converter output speed. Thus, as the difference increases, the second amount and/or rate may be increased. In one particular example, the rate of change of clutch pressure is adjusted responsive to torque converter input and output speed relative to one another. For example, when the torque converter input speed is within a range of torque converter input speed (+/−10 RPM), the rate of change of clutch pressure may be at or below a first rate of change. However, when the torque converter input speed is outside the range of torque converter input speed (>+/−10 RPM), the rate of change of clutch pressure may be a second rate of change that is above the first rate of change. As such, when the speeds are substantially the same and within the example range of 10RPM of each other, the clutch pressure may be adjusted more slowly than when the speeds are outside this range.

Other engine operating parameters may also be adjusted to enable a smooth restart. For example, fuel timing, position of cams, spark timing (advance/retard), fuel injection amount, fuel injection pressure, and throttle position may be adjusted to improve the engine start. In one example, the engine controller may be further configured with code to adjust a cam timing of the engine during the restart to increase an engine intake aircharge (via the cam timing) when the torque converter input speed (or engine speed) is higher than the torque converter output speed (or turbine speed).

In another example, fuel may be directly injected to a cylinder before engine rotation so as to assist in engine rotation when a spark is output to combust the injected fuel. In yet another example, the fuel timing may additionally be advanced or retarded relative to a crankshaft angle at which fuel was delivered to the engine prior to last engine stop. In still another example, a throttle angle may be set so that a controlled amount of air enters the cylinder during the engine restart. Further, combinations or sub-combinations of these and other parameters may be adjusted during the engine restart.

The engine control parameters may also be set in relation to the vehicle speed during the engine restart during vehicle moving conditions. For example, cam timing, throttle position, fuel start of injection, fuel timing, and spark angle may be adjusted such that the amount of torque generated by the engine at restart of the moving vehicle is at or slightly below the torque required to keep the vehicle moving at the present vehicle speed. In another example, the engine may be restarted by setting the engine control parameters to a first position at engine restart, and then shortly after start or during engine run-up, the parameters may be set to a second position that is based on the vehicle speed. In this way, the operation of the engine can be adjusted in relation to the vehicle's speed so that smooth transitions between operating the vehicle without the engine and operating the vehicle with the engine can occur.

Figure 5:
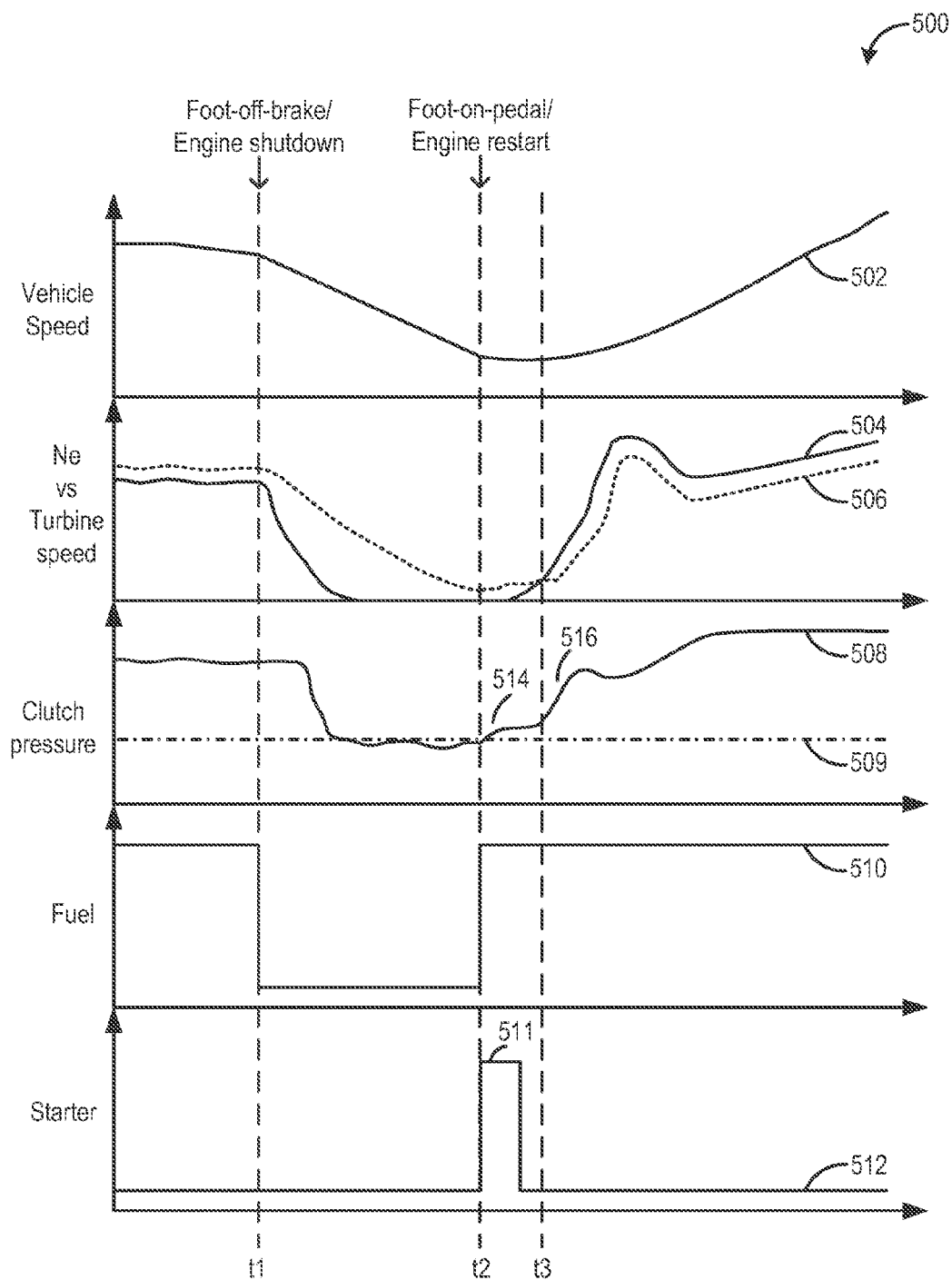
FIG. 5 shows a map graphically illustrating example engine shut-down and restart operations, according to the present disclosure.

Now turning to FIG. 5, map 500 depicts example engine shutdown and restart scenarios with a plurality of graphs 502-512. Graph 502 depicts changes in vehicle speed during the example vehicle coast engine shutdown and/or restart operations. Graph 504 depicts changes in engine speed, while graph 506 depicts changes in transmission turbine speed over the same duration. Graph 508 depicts adjustments to a transmission clutch engagement state, as indicated by corresponding changes in a transmission clutch pressure. Graph 510 provides an indication of the status of a fuel supply. Graph 512 provides an indication of the absence or presence (0 or 1) of a starter motor assist.

At t1, a vehicle moving condition, specifically a vehicle coasting condition, may be confirmed. Herein, at (as depicted) or slightly before t1, the vehicle operator may have removed his foot from the vehicle accelerator pedal and may not have pressed the brake pedal (foot-off-pedal). Further, at the time of driver foot-off from the accelerator and brake pedals, the vehicle speed may be above a threshold. As such, due to the accelerator pedal and brake pedals not being depressed, the vehicle speed may slowly decrease (graph 502) as the vehicle coasts towards a potential vehicle stop. In response to the vehicle moving condition, at t1, an engine controller may be configured to shutdown the engine, for example, by shutting off a fuel supply (graph 510) to the engine cylinders to stop combustion therein. In response to the engine shutdown, the engine speed may start to drop (graph 504) as the engine spins down to rest.

A torque converter lock-up clutch may also be disengaged during the engine shutdown to reduce a wheel torque applied by the moving wheels on the engine. Thus, as the vehicle speed slowly decreases (graph 502), a torque converter turbine speed (graph 506), or torque converter output speed, may also start to slowly decrease. The torque converter lock-up clutch may be maintained in the disengaged state until a subsequent engine restart is requested.

To reduce the torque capacity of the transmission during the shutdown, a pressure is applied on a transmission clutch to keep the clutch pre-stroked. In one example, the transmission clutch is a forward clutch and a pressure is applied on the transmission forward clutch at or near a stroke level 509. As such, before the engine shutdown was initiated the clutch pressure may have been at a higher level, and thus during the engine shutdown, the clutch pressure may be reduced to near the stroke level pressure 509. The forward clutch may be maintained pre-stroked with the clutch pressure at the reduced, near stroke level until a subsequent engine restart is requested.

At t2, while the vehicle is still moving, an engine restart condition may be confirmed. For example, the engine may be restarted in response to the vehicle operator applying his foot on the vehicle accelerator pedal (foot-on-pedal), or brake pedal. In another example, the engine may be restarted in response to the vehicle speed being a lower amount, for example, below a threshold. In response to the engine restart request, the engine controller may be configured to restart the engine, for example, by resuming fuel injection to the engine cylinders (graph 510) to start combustion therein. Additionally, the engine controller may start cranking the engine with starter motor assistance (graph 512). In response to the engine restart, the engine speed may start to rise (graph 504). In one example, the starter motor assist may be provided for a duration sufficient to raise the engine speed to a predetermined threshold speed. For example, the starter motor assist may be provided for a duration 511, and the starter may be uncoupled from the engine before the engine speed (graph 504) reaches the turbine speed (graph 506).

Additionally at t2, in response to the engine restart request following the foot-on-pedal event, with the torque converter clutch disengaged, a clutch pressure applied to the forward clutch may be increased (graph 514). An amount and/or rate of the increase is adjusted based on the torque converter output speed (herein represented by the turbine speed in graph 506) relative to the torque converter input speed (herein represented by the engine speed in graph 504). Specifically, between t2 and t3, when the torque converter input speed (engine speed) is lower than the torque converter output speed (turbine speed), the clutch pressure may be increased at a first lower rate 514 to a first lower amount of clutch pressure. Herein, the increasing of the clutch pressure at the first, lower rate may be triggered by the engine restart request and the engine speed being less than, but not equal to the turbine speed. The first rate and/or amount of clutch pressure increase may be based on a difference between the engine speed and the turbine speed when the engine speed is below the turbine speed. The clutch pressure may be maintained at the first lower amount, or continued to be increased at the first lower rate until t3 at which time the engine speed starts to exceed the turbine speed.

At t3, when the torque converter input speed (engine speed) is higher than the torque converter output speed (turbine speed), the clutch pressure may be increased at a second higher rate 516 to a second higher amount of clutch pressure. Specifically, the increasing of the clutch pressure at the second, higher rate may be triggered by the engine speed becoming equal to or exceeding the turbine speed. The second rate and/or amount of clutch pressure increase may be based on the difference between the engine speed and the turbine speed when the engine speed is above the turbine speed. The clutch pressure may then be maintained at the second higher amount, or further increased based on vehicle operating parameters such as vehicle speed, engine speed, driver demanded torque, etc.

In this way, an engine shutdown may be performed while a vehicle is moving. Further, while the engine is shutdown, a transmission clutch may be kept pre-stroked to reduce engagement delays during a subsequent engine restart. The engine may then be restarted while the vehicle is moving and with a torque converter lock-up clutch disengaged to reduce the wheel torque applied on the engine. To further enable a smooth transition through a lash region of the transmission during the engine restart, a transmission clutch pressure may be adjusted based on speeds across the torque converter. By increasing the clutch pressure at a lower rate when engine speed is lower than the turbine speed, and then increasing the clutch pressure at a higher rate when the engine speed exceeds the turbine speed, torque control during the restart may be improved, and the lash region may be traversed with reduced objectionable noise and torque disturbances. In this way, a smooth transition between combusting and non-combusting engine modes, while the vehicle is moving, may be achieved, and the drive feel at the engine restart may be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a vehicle engine having a torque converter with a clutch, and an automatic transmission with a forward clutch comprising:
    stopping the engine while the vehicle is moving;
    via a controller, applying fluid pressure to the forward clutch;
    restarting the engine while the vehicle is moving; and
    increasing the fluid pressure applied to the forward clutch based on engine speed relative to a turbine speed of the transmission.

2. The method of claim 1, wherein applying fluid pressure to a forward clutch includes applying a pressure at or near a stroke level and maintaining the pressure at or near the stroke level until the engine restart.

3. The method of claim 1, wherein the increasing the fluid pressure includes, increasing the pressure to a first, lower pressure at a first, lower rate when the engine speed is below the turbine speed, the first rate based on a difference between the engine speed and the turbine speed when the engine speed is below the turbine speed, and increasing the pressure to a second, higher pressure at a second, higher rate when the engine speed is above the turbine speed, the second rate based on the difference between the engine speed and the turbine speed when the engine speed is above the turbine speed.

4. The method of claim 1, wherein stopping the engine while the vehicle is moving includes shutting off spark and a fuel supply to the engine while the vehicle is moving at a vehicle speed above a threshold, with an accelerator pedal and a brake pedal not depressed.

5. The method of claim 1, wherein restarting the engine includes restarting the engine using a starter assist while the torque converter clutch is disengaged, the starter uncoupled from the engine before the engine speed reaches the turbine speed.

6. The method of claim 1, further comprising, adjusting a cam timing of the engine during the restart.

7. The method of claim 6, wherein the adjustment includes increasing an engine aircharge via the cam timing when the engine speed is greater than the turbine speed.

8. A vehicle system, comprising
an engine;
a transmission including a transmission forward clutch;
a torque converter including a torque converter clutch; and
a control system configured with code to,
during a vehicle moving condition,
spin down the engine to rest while the vehicle is moving and decrease a pressure applied to the forward clutch to a stroke level; and
during a starter-assisted restart from the engine rest,
with the torque converter clutch disengaged, increase a pressure applied to the forward clutch, an amount and/or rate of the increase adjusted based on a torque converter output speed relative to a torque converter input speed.

9. The system of claim 8, wherein the adjustment includes, increasing the pressure to a first, lower amount or at a first, lower rate when the torque converter input speed is lower than the torque converter output speed, and increasing the pressure to a second, higher amount and/or at a second, higher rate when the torque converter input speed is higher than the torque converter output speed.

10. The system of claim 9, wherein the control system is further configured with code to, during the restart, adjust a cam timing of the engine to increase an engine intake aircharge when the torque converter input speed is higher than the torque converter output speed.

11. The system of claim 9, wherein the torque converter input speed is inferred from an engine speed, and wherein the torque converter output speed is inferred from a transmission input shaft speed.

* * * * *